(12) United States Patent
Gurghian et al.

(10) Patent No.: US 10,173,625 B2
(45) Date of Patent: Jan. 8, 2019

(54) DETECTING HAZARDS IN ANTICIPATION OF OPENING VEHICLE DOORS

(71) Applicant: Ford Global Technologies, LLC, Dearborn, MI (US)

(72) Inventors: Alexandru Mihai Gurghian, Palo Alto, CA (US); Scott Vincent Myers, Camarillo, CA (US); Mohamed Ahmad, Mountain View, CA (US); Lisa Scaria, Milpitas, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/972,541

(22) Filed: May 7, 2018

(65) Prior Publication Data

US 2018/0251091 A1 Sep. 6, 2018

Related U.S. Application Data

(63) Continuation of application No. 15/195,799, filed on Jun. 28, 2016, now Pat. No. 10,000,172.

(51) Int. Cl.
| | |
|---|---|
| *B60B 39/00* | (2006.01) |
| *B60R 21/0134* | (2006.01) |
| *B60Q 9/00* | (2006.01) |
| *E05F 15/40* | (2015.01) |
| *G01S 17/93* | (2006.01) |
| *G01S 17/02* | (2006.01) |

(52) U.S. Cl.
CPC ......... *B60R 21/0134* (2013.01); *B60Q 9/008* (2013.01); *E05F 15/40* (2015.01); *G01S 17/026* (2013.01); *G01S 17/93* (2013.01); *E05Y 2400/54* (2013.01); *E05Y 2900/531* (2013.01)

(58) Field of Classification Search
CPC ...... B60R 21/0134; E05F 15/40; B60Q 9/008
See application file for complete search history.

(56) References Cited

U.S. PATENT DOCUMENTS

| | | | |
|---|---|---|---|
| 7,378,947 B2 | 5/2008 | Daura Luna | |
| 7,586,402 B2 | 9/2009 | Bihier | |
| 8,234,817 B2 | 8/2012 | Neundorf | |
| 2005/0085972 A1* | 4/2005 | Martinez | ............... E05C 17/00 701/49 |
| 2009/0033477 A1 | 2/2009 | Illium | |
| 2017/0236418 A1* | 8/2017 | Bostick | ................. G08G 1/143 340/932.2 |

FOREIGN PATENT DOCUMENTS

| | | |
|---|---|---|
| DE | 19537619 A1 | 4/1997 |
| DE | 102004049054 A1 | 4/2006 |
| DE | 102009032444 A1 | 3/2010 |

\* cited by examiner

*Primary Examiner* — Adam M Alharbi
(74) *Attorney, Agent, or Firm* — David R. Stevens; Stevens Law Group

(57) ABSTRACT

The present invention extends to methods, systems, and computer program products for detecting hazards in anticipation of opening vehicle doors. Vehicle sensors (e.g., rear viewing cameras) can be used to detect and classify traffic, for example, as pedestrians, bicyclists, skateboarders, roller skaters, wheel chair, etc., approaching on the side of a vehicle. When there is a possibility of a vehicle occupant opening a door into approaching traffic, a warning can be issued in the vehicle cabin to alert vehicle occupants of the approaching traffic. In one aspect, a vehicle prevents a door from opening if opening the door would likely cause an accident.

20 Claims, 6 Drawing Sheets

DETECTING HAZARDS IN ANTICIPATION OF OPENING VEHICLE DOORS

CROSS-REFERENCE TO RELATED APPLICATIONS

This application is a continuation of and claims the benefit of and priority to U.S. patent application Ser. No. 15/195,799, entitled "Detecting Hazards In Anticipation Of Opening Vehicle Doors", filed Jun. 28, 2016, the entire contents of which are expressly incorporated by reference.

BACKGROUND

1. Field of the Invention

This invention relates generally to the field of vehicle safety, and, more particularly, to detecting hazards in anticipation of opening vehicle doors.

2. Related Art

Motor vehicles (cars, trucks, etc.) are often parallel parked on the side of roadways that carry mixed traffic. Mixed traffic includes motor vehicles, motorcycles, bicyclists, pedestrians, skateboarders, etc. Some types of traffic on a roadway are smaller and able to change direction and speed relatively quickly. For example, bicyclists, and skateboarders may make frequent changes to speed and direction. Further, many types of traffic do not obey traffic rules and regulations. For example, bikers and skateboarders often move between pedestrian sidewalks and adjacent roadways to suit their own needs providing little, if any, prior warning or consideration for others.

After a driver parallel parks on a roadway (e.g., on a street next to the curb), the driver and other occupants can check rear view mirrors and/or look out a vehicle's windows to check for any approaching traffic prior to exiting the vehicle. If no traffic is approaching on the side of a vehicle occupant, the vehicle occupant can open a door to exit the vehicle. However, due to the smaller size of some traffic, the occupant may not see the approaching traffic. Further, due to the ability of some traffic to change direction and speed quickly as well as their disregard for traffic rules and regulations, approaching traffic may appear between the time an occupant checks for traffic and begins to open the door. Under any of these scenarios, a vehicle occupant may open a vehicle door causing a hazard to the approaching traffic. If the approaching traffic is a pedestrian, biker, or skateboarder, physical injury may occur.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for detecting hazards in anticipation of opening vehicle doors. Vehicle sensors (e.g., rear viewing cameras) can be used to detect approaching pedestrians, bicyclists, skateboarders, roller skaters, wheel chairs, and other types of traffic approaching on the side of a vehicle. A warning can be issued in the vehicle cabin to alert vehicle occupants of the approaching traffic. In one aspect, a vehicle prevents a door from opening if opening the door would likely cause an accident.

Sensor data (e.g., an image from a rear view camera) is fed to a neural network. The neural network classifies a type of approaching traffic (e.g., bicyclist, skateboarder, etc.). Regions of interest within sensor data may be detected using optical flow or by fixed regions in the sensor data based on vehicle geometry. When approaching traffic is detected, the vehicle can issue an audible warning and prevent doors from opening.

Sensors can continually monitor the rear of a vehicle and feed sensor data to a neural network. The neural network can process the sensor data on an ongoing basis to detect approaching traffic that would cause an accident if a door is opened. To determine if a person is inside a vehicle, a key fob can be detected and/or weight or heat sensors can be embedded in the seats. If a vehicle is occupied and a neural network detects approaching traffic, an alarm can sound in the vehicle cabin. In one aspect, an alarm sounds when an occupant attempts to open a door. An attempt to open a door can be detected using an impedance based sensor.

Figure 1:
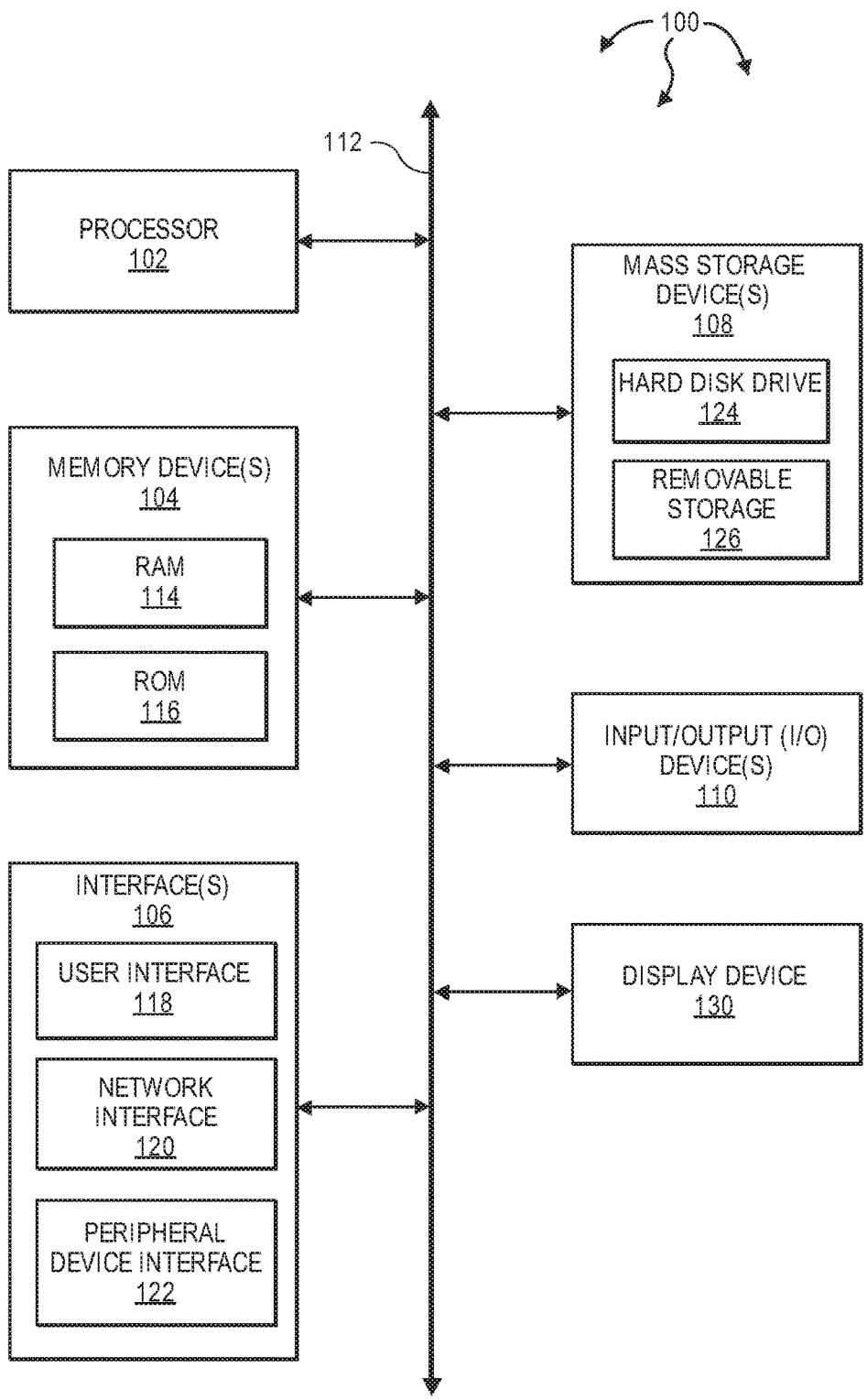
FIG. 1 illustrates an example block diagram of a computing device.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
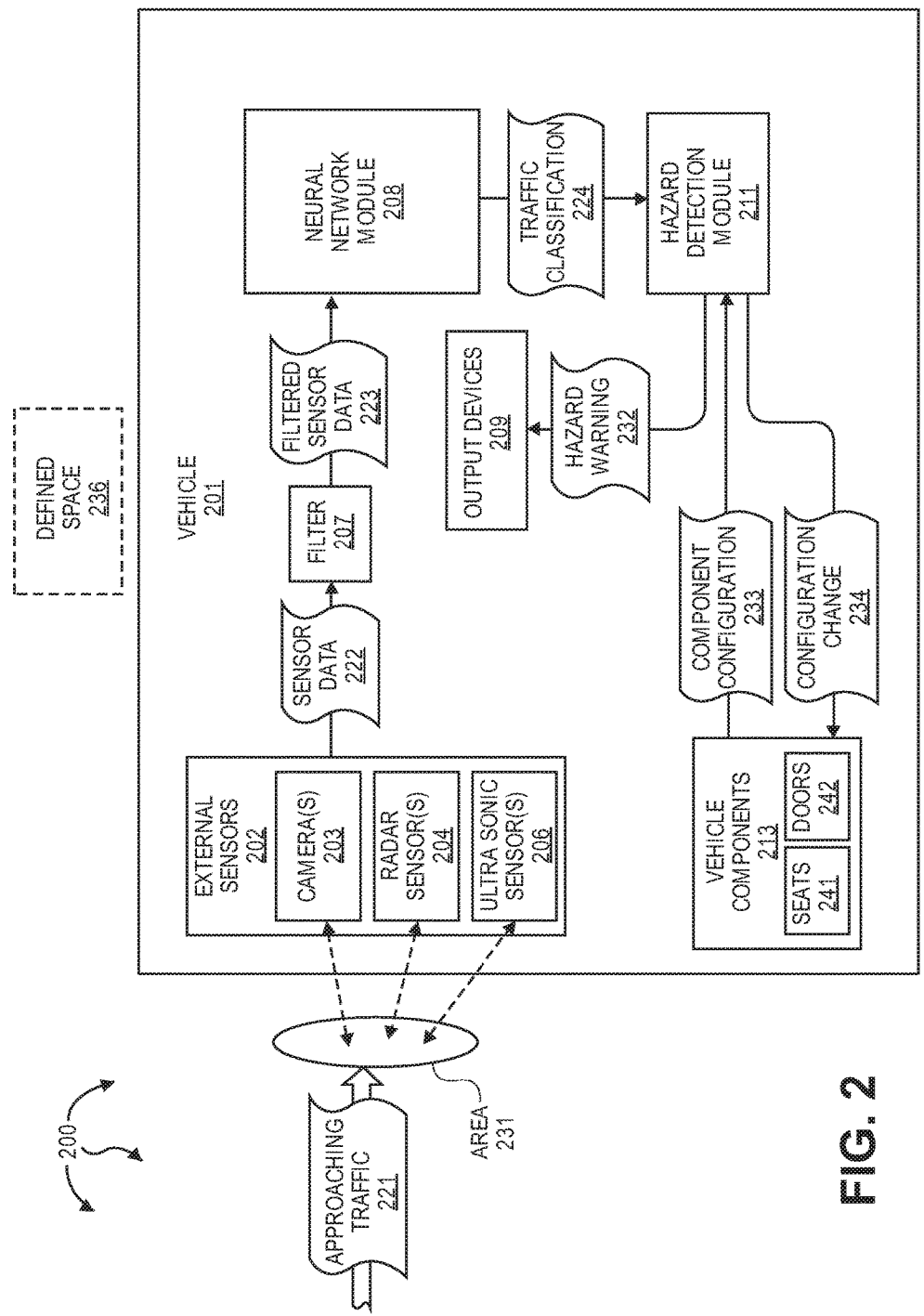
FIG. 2 illustrates an example environment that facilitates detecting hazards in anticipation of open vehicle doors.

FIG. 2 illustrates an example environment 200 that facilitates detecting hazards in anticipation of open vehicle doors. Environment 200 includes vehicle 201, such as, for example, a car, a truck, or a bus. Vehicle 201 can contain a driver (not shown) and possibly one or more other occupants (not shown). Vehicle 201 can be parallel parked on a roadway and can include a plurality of side opening doors (e.g., two doors or four doors). Environment 200 also includes approaching traffic 221, such as, for example, a bicyclist, a skateboarder, a roller skater, etc.

Vehicle 201 includes external sensors 202, filter 207, neural network 208, output devices 209, hazard detection module 211, and vehicle components 213. External sensors 202 are mounted externally on vehicle 201. External sensors 202 include camera(s) 203, radar sensor(s) 204, and ultrasonic sensor(s) 206. External sensors 202 can also include other types of sensors (not shown), such as, for example, acoustic sensors, LIDAR sensors, and electromagnetic sensors. IN general, external sensors 202 can monitor traffic in the vicinity of vehicle 201. External sensors 202 can output sensor data indicating the position and optical flow (i.e., direction and speed) of monitored traffic. From sensor data, vehicle 201 can determine if opening a door would be a hazard to approaching traffic.

Vehicle components 213 include seats 241 and doors 242. Vehicle components 213 can also include other vehicle components (not shown), such as, for example, headlights, tail lights, horn, climate control, etc.

Output devices 209 can include one or more speakers and one or more display devices.

Filter 207 (e.g., a Kalman filter, a Particle filter, etc.) can access sensor data output by external sensors 202. Filter 207 can formulate filtered sensor data by retaining sensor data for approaching traffic that has a path likely to pass through space near to at least one of doors 242. Filter 207 can also formulate filtered sensor data by filtering out sensor data for approaching traffic that has a path unlikely to pass through space near to any of doors 242. Sensor data for traffic unlikely to pass through a space near any of doors 242 can be ignored. Sensor data for traffic likely to pass through space near at least one of doors 242 can be sent to neural network module 208.

Neural network module 208 can receive filtered sensor data for approaching traffic likely to pass through space near one of doors 242. Neural network module 208 can process sensor data for approaching traffic to more precisely determine the likely path of approaching traffic. Neural network module 208 can also classify approaching traffic by traffic type, such as, for example, bicyclist, skateboarder, roller skater, etc. Alternately, neural network module 208 can calculate a probability that approaching traffic is a particular traffic type.

Neural network module 208 can include a neural network architected in accordance with a multi-layer (or "deep") model. A multi-layer neural network model can include an input layer, a plurality of hidden layers, and an output layer. A multi-layer neural network model may also include a loss layer. For classification of sensor data (e.g., an image), values in the sensor data (e.g., pixel-values) are assigned to input nodes and then fed through the plurality of hidden layers of the neural network. The plurality of hidden layers can perform a number of non-linear transformations. At the end of the transformations, an output node yields a value that corresponds to the class (e.g., pedestrian, bicyclist, skateboarder, roller skater, etc.) inferred by the neural network.

The neural network can be trained to distinguish between desired classes, such as, for example, between pedestrians, bicyclists, skateboarders, roller skaters, etc. The neural network can be trained to detect and track the path of approaching traffic, in order to determine the likelihood of an open door being a hazard. The neural network can also be trained to detect if multiple traffic objects are approaching vehicle 201 and distinguish between the different traffic objects.

Traffic classifications (and/or traffic classification probabilities) for approaching traffic can be presented at a display in output devices 209. Even when approaching traffic is unlikely to pass near to a vehicle door, vehicle occupants may desire to be aware of the approaching traffic. Traffic classifications for approaching traffic (and/or traffic classification probabilities) can also be sent to hazard detection module 211. Based on the traffic classification (and/or traffic classification probabilities) for approaching traffic and configuration of vehicle components 213, hazard detection module 211 may cause vehicle 201 to respond in a specified manner.

For example, when approaching traffic is likely to pass near one of doors 242 and the seat 241 next to the door is occupied, hazard detection module 211 can output an audible warning in the cabin of vehicle 201. Hazard detection module 211 can also change the configuration of vehicle components 213. For example, hazard detection module 211 can vibrate the seats 241 and/or prevent the one of doors 242 from opening until the approaching traffic passes the door.

Components of vehicle 201 can be connected to one another over (or be part of) a network, such as, for example, a PAN, a LAN, a WAN, a controller area network (CAN) bus, and even the Internet. Accordingly, the components of vehicle 201, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Vehicle 201 can include a heterogeneous computing platform having a variety of different types and numbers of processors. For example, the heterogeneous computing platform can include at least one Central Processing Unit (CPU), at least one Graphical Processing Unit (GPU), and at least one Field Programmable Gate Array (FPGA). Aspects of the invention can be implemented across the different types and numbers of processors.

Figure 3:
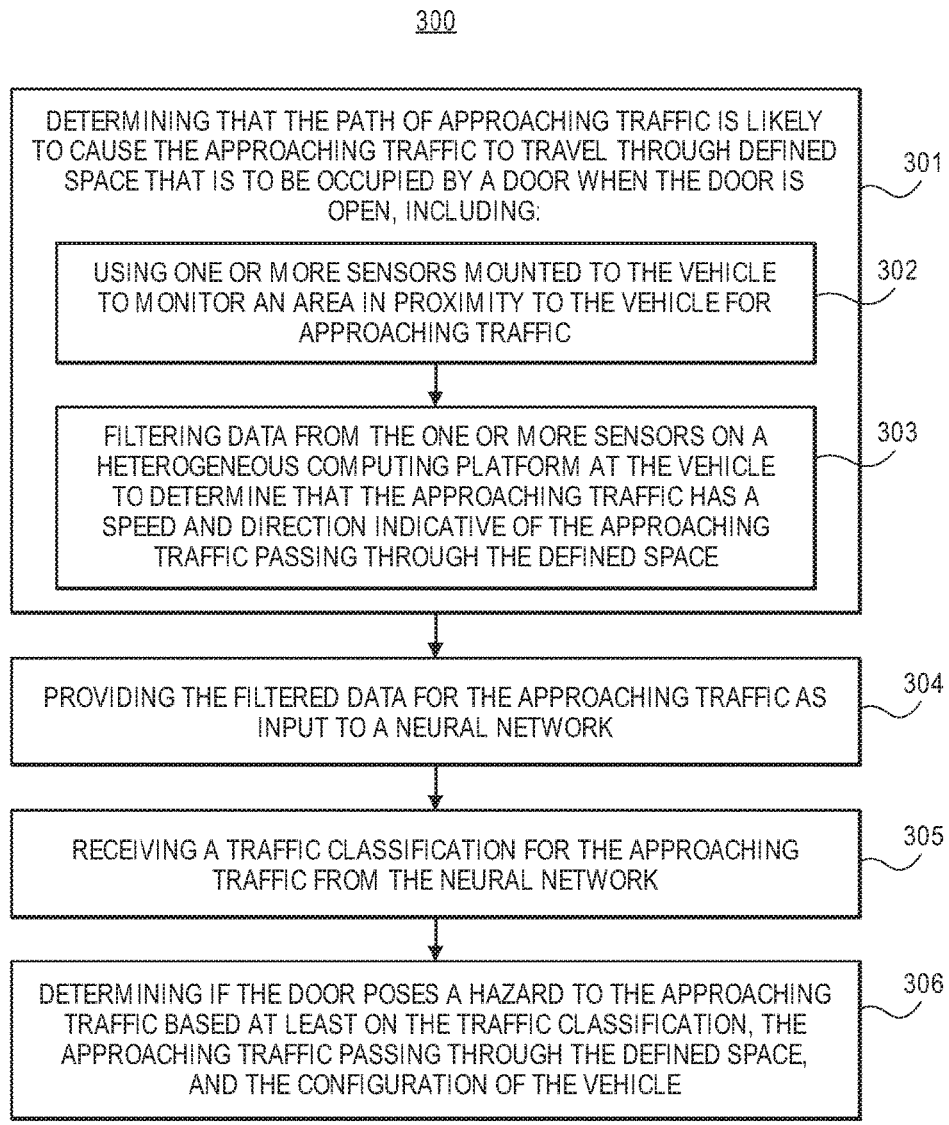
FIG. 3 illustrates a flow chart of an example method for detecting hazards in anticipation of opening vehicle doors.

FIG. 3 illustrates a flow chart of an example method 300 for detecting hazards in anticipation of opening vehicle doors. Method 300 will be described with respect to the components and data of environment 200.

Method 300 includes determining that the path of approaching traffic is likely to cause the approaching traffic to travel through defined space that is to be occupied by a door when the door is open (301). For example, vehicle 201 can determine that approaching traffic 221 is likely to pass through defined space 236 (the space one of doors 242 opens into).

Determining that the path of the approaching traffic is likely to cause the approaching traffic to travel through defined space includes using one or more sensors mounted to the vehicle to monitor an area in proximity to the vehicle for approaching traffic (302). For example, external sensors 202 can monitor area 231 for approaching traffic. In one aspect, area 231 is an area to the rear of vehicle 201. As area 231 is monitored, external sensors 202 can generate sensor data 222 from sensing objects within area 231. Sensor data 222 can include the optical flow (i.e., speed and direction) of approaching traffic 221 (as well as the optical flow of any other traffic within area 231).

Determining that the path of the approaching traffic is likely to cause the approaching traffic to travel through defined space includes filtering data from the one or more sensors on a heterogeneous computing platform at the vehicle to determine that the approaching traffic has a speed and direction indicative of the approaching traffic passing through the defined space (303). For example, filter 207 can filter sensor data 222 into filtered sensor data 223. Filtered sensor data 223 includes sensor data for approaching traffic having an optical flow (e.g., speed and direction) indicative of the approaching traffic passing through defined space 236. For example, filtered sensor data 223 can include the speed and direction of approaching traffic 221. The speed and direction of approaching traffic 221 can indicate that the path of approaching traffic 221 is likely to pass through defined space 236.

Method 300 includes providing the filtered data for the approaching traffic as input to a neural network (304). For example, filter 207 can provide filtered sensor data 223 as input to neural network module 208. Neural network module 208 can process filtered sensor data 223 to infer traffic classification 224 (e.g., walking pedestrian, bicyclist, skateboarder, roller skater, etc.) for approaching traffic 221. Neural network module 208 can also process filtered sensor data 223 to infer traffic classifications for other traffic approaching vehicle 201. Method 300 includes receiving a traffic classification for the approaching traffic from the neural network (305). For example, hazard detection module 211 can receive traffic classification 224 from neural network 208.

Method 300 includes determining if the door poses a hazard to the approaching traffic based at least on the traffic classification, the approaching traffic passing through the defined space, and the configuration of the vehicle (306). For example, hazard detection module can determine if the door 242 poses a hazard to approaching traffic 221 based at least on traffic classification 224, approaching traffic 221 passing through defined space 236, and the configuration of vehicle components 213. Hazard detection module 211 can access component configuration 233 to determine the configuration of vehicle components 213. The configuration of vehicle components 213 can include whether or not a seat 241 nearest to defined space 236 is occupied, whether a door handle of the door 242 nearest to defined space 236 has been actuated, etc. The configuration of vehicle components 213 can also include whether or not the door 242 nearest to defined space 236 is in the process of being opened.

Based on traffic classification 224, hazard detection module 211 may determine there is not a hazard. For example, traffic classification 224 may indicate that approaching traffic 221 is a walking pedestrian. As such, a vehicle occupant may have time to safely open the door 242 without creating a hazard for the walking pedestrian.

Based on component configuration 233, hazard detection module 211 may determine there is not a hazard. For example, component configuration 233, may indicate that the seat 241 nearest to defined space 236 is not occupied. As such, hazard detection module 211 determines that the likelihood of a corresponding door 242 being opened into defined space 236 is very low. Thus, even if approaching traffic 221 is moving at a higher rate of speed, approaching traffic 221 is likely to pass by vehicle 201 without incident.

Based on traffic classification 224, vehicle configuration, and approaching traffic 221 passing through defined space 236, hazard detection module can determine that the door 242 does pose a hazard on approaching traffic 221. For example, if the seat 241 nearest to defined space 236 is occupied, there is some chance the occupant could open the door 242 nearest to defined space 236 as approaching traffic 221 passes through defined space 236. Opening the door 242 as approaching traffic 221 passes through defined space 236 could cause a collision between approaching traffic 221 and the door 242 resulting in human injury.

When the door 242 poses a hazard, hazard detection module 211 can send hazard signal 232 to output devices 209, such as, for example, one or more speakers and a display device. The display device can indicate the hazard on a screen in the cabin of vehicle 201. Hazard signal 232 can include an audible alert. The audible alert can be output at the one or more speakers so that occupants not looking at the display device are made aware of approaching traffic 221 passing through defined space 236. Hazard warning 232 can also provide a haptic signal, for example, causing the occupants seat 241 to vibrate.

When the door 242 poses a hazard, hazard detection module 211 can also send configuration change 234 to vehicle components 213. Configuration change 234 can prevent the door nearest defined space 236 (or all doors on that side of the vehicle 201) from opening until approaching traffic 221 safely passes vehicle 221.

Figure 4A:
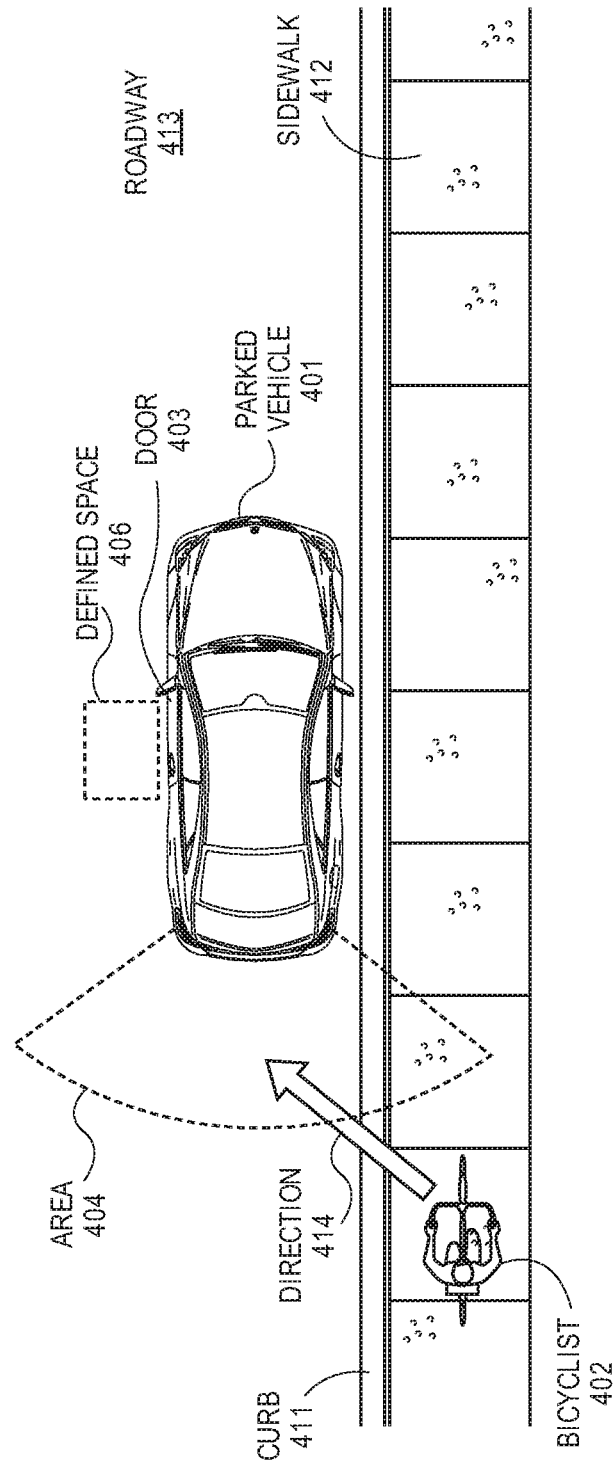
FIGS. 4A-4C illustrate an example of approaching traffic causing a door opening hazard.
Figure 4B:
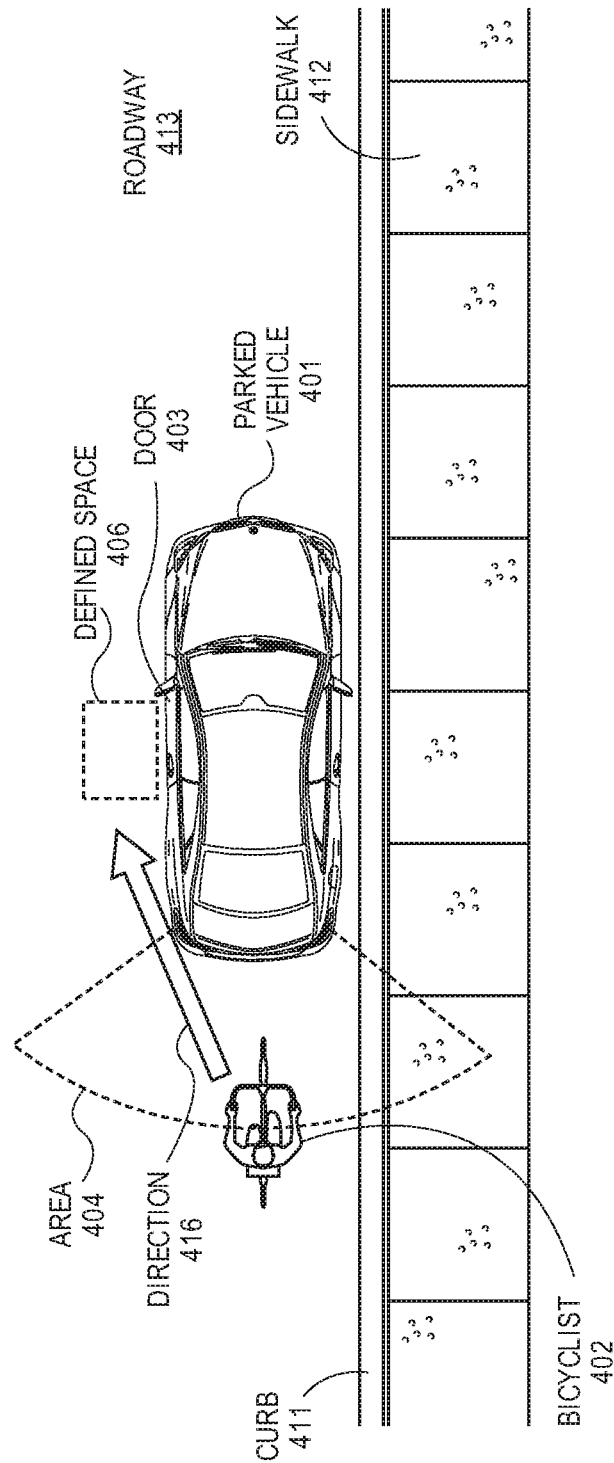
Figure 4C:
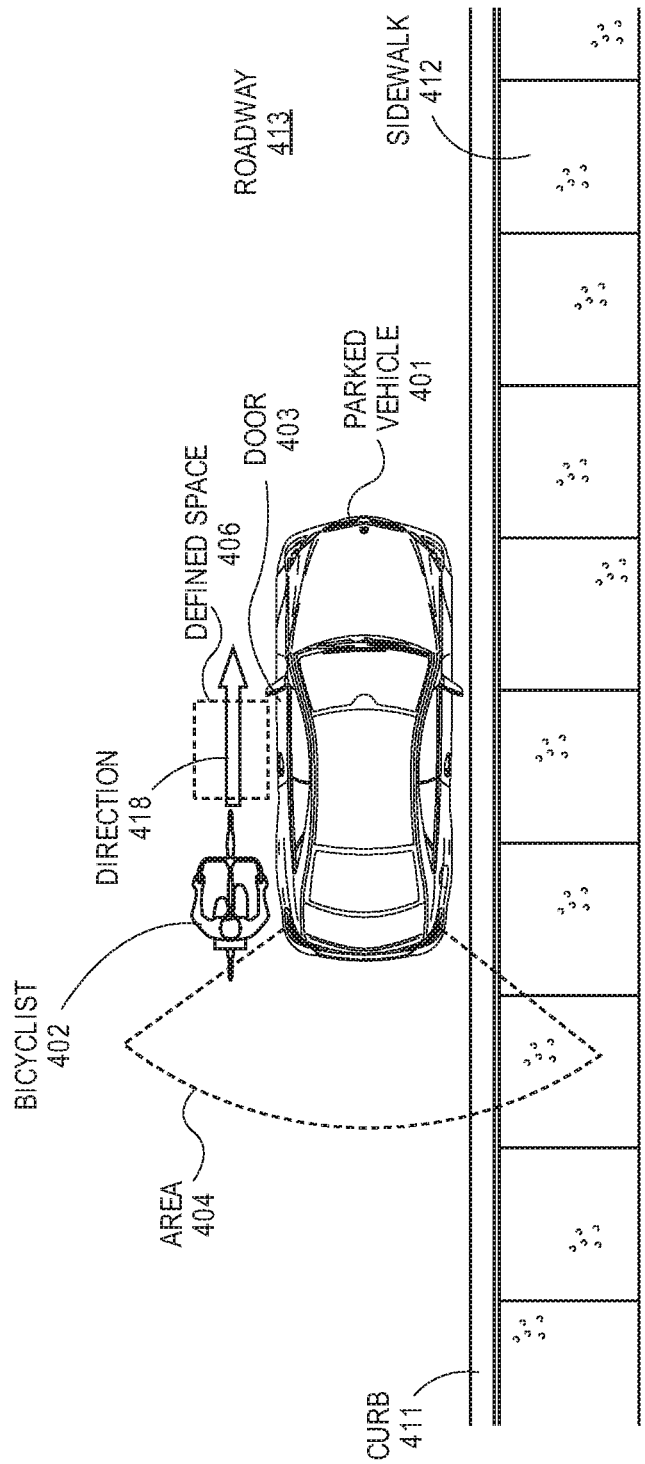

FIGS. 4A-4C illustrate an example of approaching traffic causing a door opening hazard. FIG. 4A includes parked vehicle 401 and bicyclist 402. In FIG. 4A, parked vehicle 401 is parked next to curb 411 of roadway 413. Parked vehicle 401 may have been recently parked and still contain one or more occupants. One or more external mounted sensors (e.g., one or more cameras) on parked vehicle 401 can monitor area 404 for approaching traffic. The driver of parked vehicle 401 may have checked for approaching traffic and observed that bicyclist 402 was on sidewalk 412. As such, the driver assumed that it was safe to open door 403 into defined space 406. However, immediately after the driver observing bicyclist 402, bicyclist 402 may change path to direction 414.

Turning to FIG. 4B, since bicyclist 402 is heading in direction 416, bicyclist 402 moves into area 404. The one or more sensors monitoring area 404 can detect bicyclist 402 in area 404. The sensors can send sensor data to a neural network in vehicle 401. The neural network can classify bicyclist 402 as a bicyclist. The one or more sensors can track the optical flow of bicyclist 402 through area 404 to determine bicyclist 402 is now heading in direction 416. Based on bicyclist 02 heading in direction 416, the one or more sensors can determine that there is some likelihood of bicyclist 402 passing through defined space 406. However, the driver of vehicle 401 may be unaware of bicyclist 402's changes of direction.

To avoid a hazard to bicyclist 402, parked vehicle 401 can output an audible signal in the cabin of vehicle 401. The audible signal can notify the driver that opening door 403 into defined space 406 may cause a hazard. Parked vehicle 401 can also prevent door 403 from opening until bicyclist 402 passes parked vehicle 401.

Turning to FIG. 4C, bicyclist 402 changes to direction 418. Bicyclist 402 passes through defined space 406. However, a potential hazard is avoided due to parked vehicle 401 warning the driver and/or preventing door 403 from opening into define space 406 until bicyclist 402 passes through defined space 406.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, filtered sensor data, traffic classifications, component configurations, configuration changes, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, filtered sensor data, traffic classifications, component configurations, configuration changes, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for use at a vehicle, the method comprising:
    calculating a speed and direction of traffic approaching the vehicle from sensor data collected at the vehicle;
    determining that the traffic is to pass through a space adjacent to a vehicle door based on the calculated speed and direction of the traffic;
    determining that the vehicle door poses a hazard to the traffic based at least on: a traffic classification of the traffic, the traffic being determined to pass through the space, and a configuration of the vehicle; and
    preventing the vehicle door from opening until the traffic passes the space.

2. The method of claim 1, wherein calculating a speed and a direction of traffic approaching the vehicle comprises calculating the speed and direction of the traffic from sensor data collected at one or more of: a camera, a LIDAR sensor, or an ultrasonic sensor.

3. The method of claim 1, further comprising receiving the traffic classification from a neural network.

4. The method of claim 3, wherein receiving the traffic classification comprises receiving a classification indicating that the traffic is one of: a walking pedestrian, a bicyclist, a skate boarder, a wheel chair, or a roller skater.

5. The method of claim 1, further comprising outputting a signal in the cabin of the vehicle to indicate the hazard.

6. The method of claim 5, wherein outputting a signal in the cabin of the vehicle comprises outputting one of: an audible signal, a visual signal, or a haptic signal.

7. The method of claim 1, further comprising filtering the sensor data prior to calculating the speed and direction of the traffic.

8. The method of claim 7, wherein filtering the sensor data comprises determining the optical flow of the traffic; and
    wherein determining that the traffic is to pass through a space adjacent to a vehicle door comprises determining that the traffic is to pass through the space based on the optical flow of the traffic.

9. The method of claim 7, wherein filtering the sensor data comprises filtering data from a plurality of sensors on a heterogeneous computing platform at the vehicle that includes at least two of: a Central Processing Unit (CPU), a Graphical Processing Unit (GPU), or a Programmable Gate Array (FPGA).

10. The method of claim 1, wherein determining that the vehicle door poses a hazard to the traffic comprises detecting that a door handle for the vehicle door has been actuated.

11. A vehicle comprising:
    one or more sensors for monitoring an area in proximity to the vehicle;
    a door;
    a processor; and
    system memory coupled to the processor and storing instructions configured to cause the processor to:
        calculate a speed and direction of traffic approaching the vehicle from sensor data collected at the one or more sensors;
        determine the traffic is to pass through a space adjacent to the door based on the calculated speed and direction of the traffic;
        determine that the door poses a hazard to the traffic based at least on: a traffic classification of the traffic, the traffic being determined to pass through the space, and a configuration of the vehicle; and
        prevent the door from opening until the traffic passes the space.

12. The vehicle of claim 11, wherein instructions configured to cause the processor to calculate a speed and direction of traffic approaching the vehicle comprise instructions configured to cause the processor to calculate the speed and direction of the traffic from sensor data collected at one or more of: a camera, a LIDAR sensor, or an ultrasonic sensor.

13. The vehicle of claim 11, further comprising instructions configured to cause the processor to receive the traffic classification from a neural network.

14. The vehicle of claim 13, wherein instructions configured to cause the processor to receive the traffic classification comprises instructions configured to cause the processor to receive a classification indicating that the traffic is one of: a walking pedestrian, a bicyclist, a skate boarder, a wheel chair, or a roller skater.

15. The vehicle of claim 11, further comprising instructions configured to cause the processor to output a signal in the cabin of the vehicle to indicate the hazard.

16. The vehicle of claim 15, wherein instructions configured to cause the processor to output a signal in the cabin of the vehicle comprise instructions configured to cause the processor to output one of: an audible signal, a visual signal, or a haptic signal.

17. The vehicle of claim 11, further comprising instructions configured to cause the processor to filter the sensor data prior to calculating the speed and direction of the traffic.

18. The vehicle of claim 7, wherein instructions configured to cause the processor to filter the sensor data comprise instructions configured to cause the processor to determine the optical flow of the traffic; and wherein instructions configured to cause the processor to determine that the traffic is to pass through a space adjacent to the door comprise instructions configured to cause the processor to determine that the traffic is to pass through the space based on the optical flow of the traffic.

19. The system of claim 11, wherein instructions configured to cause the processor to determine that the door poses a hazard to the traffic comprise instructions configured to cause the processor to detect that a door handle has been actuated.

20. The vehicle of claim 11, further comprising instructions configured to cause the processor to output a signal in the cabin of the vehicle indicating a possibility of a collision between the traffic and the door.

* * * * *